United States Patent [19]

Acitelli et al.

[11] Patent Number: 4,540,595
[45] Date of Patent: Sep. 10, 1985

[54] ARTICLE IDENTIFICATION MATERIAL AND METHOD AND APPARATUS FOR USING IT

[75] Inventors: Mario A. Acitelli; Richard F. Tynan, both of Charlotte; Alan R. Wayson, Concord, all of N.C.

[73] Assignee: International Business Machines Corporation, Armonk, N.Y.

[21] Appl. No.: 433,311

[22] Filed: Oct. 7, 1982

Related U.S. Application Data

[63] Continuation-in-part of Ser. No. 344,667, Feb. 1, 1982, abandoned.

[51] Int. Cl.³ .................. B41M 3/14; B44F 1/12; B05C 11/00
[52] U.S. Cl. .......................... 427/7; 8/527; 106/20; 118/46; 118/712; 427/8; 427/157
[58] Field of Search ............... 427/7, 53.1, 157, 55, 427/8; 8/527; 346/75; 106/20; 118/46, 712

[56] References Cited

U.S. PATENT DOCUMENTS

| | | | |
|---|---|---|---|
| 3,027,830 | 4/1962 | Yaeger | 101/2 |
| 3,105,908 | 10/1963 | Burkhardt et al. | 250/219 |
| 3,395,284 | 7/1968 | Smith | 250/219 |
| 3,422,266 | 1/1969 | Ramsley | 250/71 |
| 3,634,017 | 1/1972 | Ottawa | 8/527 |
| 3,703,628 | 11/1972 | Philipson, Jr. | 235/61.9 R |
| 3,705,043 | 12/1972 | Zabiak | 106/20 |
| 3,731,222 | 5/1973 | Drexhale | 544/103 X |
| 3,933,094 | 1/1976 | Murphy et al. | 101/426 |
| 3,946,203 | 3/1976 | Hecht et al. | 235/61.11 E |
| 3,969,612 | 7/1976 | McJohnson | 235/61.11 E |
| 3,993,894 | 11/1976 | Walker | 235/61.11 E |
| 4,007,462 | 2/1977 | Wetsel, Jr. | 346/1 |
| 4,013,997 | 3/1977 | Treadwell, III | 340/146.1 AL |
| 4,202,491 | 5/1980 | Suzuki | 235/491 |
| 4,248,636 | 2/1981 | Sasaki et al. | 106/23 |
| 4,451,530 | 5/1984 | Kaule et al. | 428/403 X |

FOREIGN PATENT DOCUMENTS

| | | |
|---|---|---|
| 1928297 | 12/1969 | Fed. Rep. of Germany . |
| 1794248 | 4/1971 | Fed. Rep. of Germany . |
| 1439173 | 6/1976 | United Kingdom ........... 427/7 |

OTHER PUBLICATIONS

Richard C. Benson and Henry A. Kues, Absorption and Fluorescence Properties of Cyanine Dyes, Journal of Chemical and Engineering Data, vol. 22, No. 4, 1977.

*Primary Examiner*—Michael R. Lusignan
*Attorney, Agent, or Firm*—E. Ronald Coffman

[57] ABSTRACT

An ink that fluoresces in the near infrared is used to mark documents such as bank checks for automatic identification. Markings with this ink are reliably detectable, even in the presence of other markings commonly found on such documents. The preferred fluorescent material of our invention is a phenoxazine dye 3,7-BIS(diethylamino) phenoxazonium nitrate.

10 Claims, 5 Drawing Figures

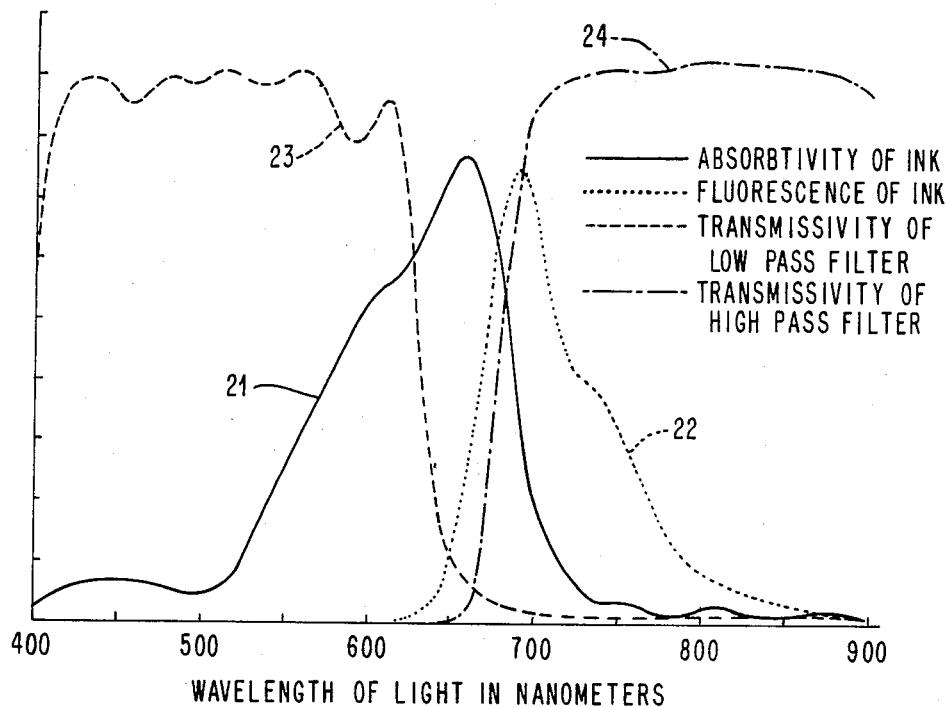

ARTICLE IDENTIFICATION MATERIAL AND METHOD AND APPARATUS FOR USING IT

This is a continuation-in-part application of Ser. No. 344,667, filed Feb. 1, 1982, now abandoned.

FIELD OF THE INVENTION

This invention relates to document sorting. More particularly, it relates to the application of identification marks on documents or other articles, which identification marks are subsequently used for automatic identification and sorting. This invention is especially related to the marking of financial documents, such as bank checks, which typically are printed on patterned paper and which receive overprinted marks from a variety of sources during their useful life.

BACKGROUND OF THE INVENTION

Bank check processing equipment is known which employs an ink jet printer for applying unique bar code markings to bank checks as they move through a high speed transport. The transport normally performs additional operations such as reading, microfilming, sorting, etc. The bar code printers have employed fluorescent inks to make the marking more distinct in the presence of other inks normally found on bank checks. Considerable interference still exists however since the fluorescent inks emit light in the visible spectrum and the other inks used to mark checks are selected for their ability to absorb visible light. Furthermore, other materials, whether inks or the paper itself, may produce visible fluorescence, especially under the stimulation of ultraviolet light. Thus conventional bank check marking inks can interfere with the readability of known fluorescent bar code marking, either by covering the marking or by adding extraneous fluorescence in addition to the marking. Interference by quenching of the fluorescence can exist even where the bar code is printed on top of a material that is absorptive of light in the wave-length of the bar code fluorescence.

SUMMARY OF THE INVENTION

Our invention employs an ink that is suitable for ink jet printing and contains, as its marking constituent, a material that fluoresces primarily in the near infrared range of radiation, i.e., generally between 650 and 800 nanometers (NM), in response to activating light in the range of 550 to 700 NM. The intensity of the emitted fluorescence is typically at least an order of magnitude stronger than the fluorescence of other materials normally found on bank checks. More importantly, most of these other marking materials are relatively transparent to light in the near infrared even though they are relatively effective absorbers of visible light. This relatively transparency allows the near infrared fluorescence of our material to produce a reliably detectable signal even in the presence of most typical other materials, whether placed on the bank check prior to or after the fluorescent material.

The fluorescent material is carried for ink jet printing in a solvent vehicle which upon drying leaves no interfering residue that would reduce the effectiveness of light transmission to or from the fluorescent material. The preferred ink vehicle is water based and includes major constituents that evaporate and are absorbed into the surface of the item being marked. The dye alone is relied on for visible color since the inclusion of supplementary pigments in the ink vehicle would interfere with the desired light transmission.

In carrying out our invention, we have employed as the active ingredient, those phenoxazine derivative dyes based on the structure

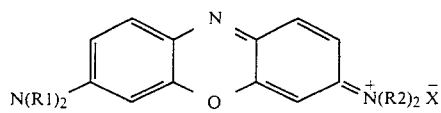

wherein R1 and R2 are alkyl and X is the anion.

Such dyes include more complex derivatives such as 3,7-BIS(ethylamino)-2,8-dimethylphenoxin-5-ium Perchlorate having the structure

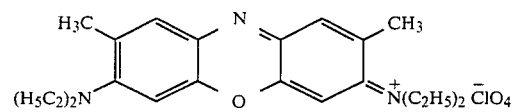

Fused ring derivatives are also possible; one example being the benzo phenoxazines which have the structure

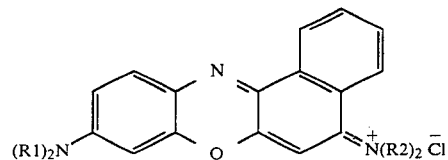

wherein R1 and R2 are alkyl and the anion is chloride.

These materials not only provide the desired fluorescence, but even at the low concentrations which produce the most efficient fluorescent response, these dyes have a sufficient visible color intensity to allow their use for marking human readable text. A single printer intelligible markings of using a single ink thus can print both machine and human readable data. In a more general sense, those dyes that fluoresce in the preferred range of 650 to 800 NM will tend to absorb light in the visible spectrum and thus be useful for making human readable markings. Materials that fluoresce at longer infrared wave-lengths tend to be invisible to the naked eye.

Our preferred phenoxazine dye is 3,7-BIS(diethylamino)phenoxazonium nitrate which has the structure

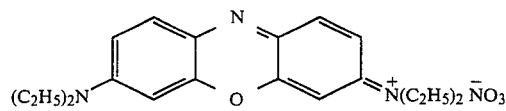

This structure is derived from the more general structure by selecting R1 and R2 to be ethyl and the anion X to be nitrate. This dye is compatible with typical ink jet ink vehicles and has most of its fluorescent energy at wave-lengths in excess of 700 NM. Furthermore it marks with a clearly visible light blue color even when used in extremely low concentrations, e.g. 0.10% to 0.15% by weight in the ink vehicle.

These and other objects, features and advantages of our invention will appear from the following description of a preferred embodiment, together with a description of equipment showing the method and apparatus for using the inventive material.

In the Figures:

FIG. 3 is a graph showing the operating spectrum of the preferred dye of our invention and of the filters used in conjunction with that dye.

FIG. 4 is a facsimile of the back side of a typical bank check illustrating the various markings made during the processing of the check.

Figure 1:
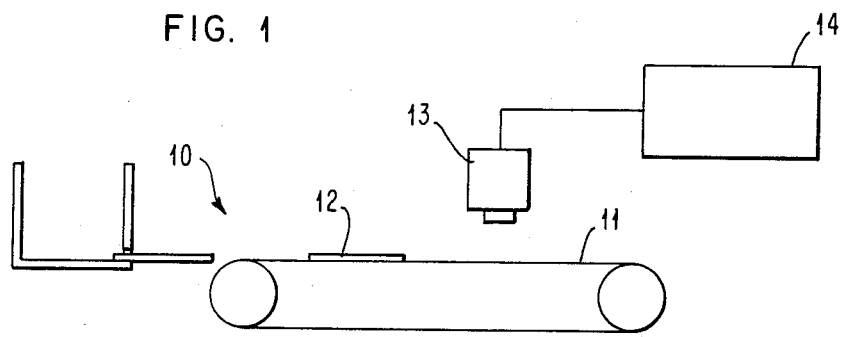
FIG. 1 shows a schematic document transport including an ink jet printer for applying the material of our invention.

In FIG. 1 there is shown a document preparation apparatus 10, comprising a high speed transport 11 for moving documents such as bank checks 12 past the operating head of an ink jet printer 13. Printer 13 is controlled by a computer 14 to apply a unique identifying mark such as a bar code on the check 12, using an ink having a fluorescent material in accordance with our invention. The identifying marking can have whatever data content is desired. For example, a code representing the institution processing the check together with a serial number indicating the date and sequence number of the check processed would be useful in assisting that institution to locate checks they have previously processed within a specified time frame. Furthermore, if the code indicates the immediate source of the check, the code marking can assist the automatic return of the check to its source when required by the transaction. It is preferred to provide control means for the printer 13 that causes printing in separate fields on the checks 12, as required to prevent successive institutions having printers using the fluorescent ink of our invention from overprinting each other's identifying codes. Such control mechanism forms no part of our invention and is not necessary for an understanding of it.

Figure 2:
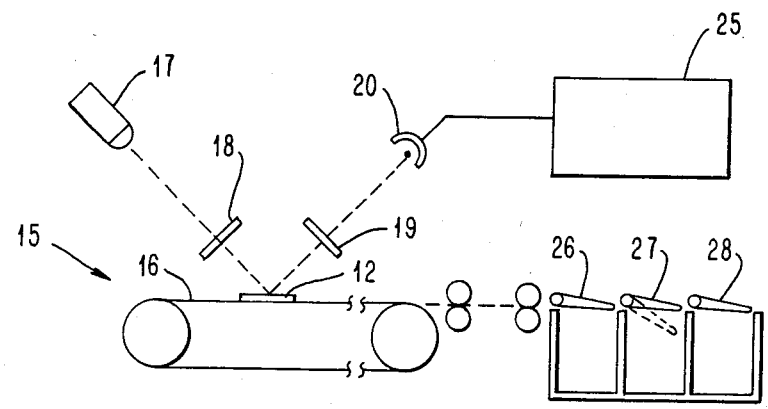
FIG. 2 shows a document transport including a reader/sorter for detecting the pattern marking of our material and controlling the operation of the machine in response thereto.

FIG. 2 shows a document processing system 15 for automatically handling checks 12 that have been marked in accordance with our invention. The system 15 includes a transport 16 that moves the checks 12 past a reading station where the markings applied by the system of FIG. 1 are detected. The reading station consists of a light source 17 of activating radiation which produces visible light directed at the surface of check 12. A lo-pass filter 18 blocks that portion of the source radiation falling in the near infrared spectrum, i.e. above about 650 NM. The light reaching the check 12 otherwise may be either broad band or narrow band but should contain a substantial portion of its light energy at wave-lengths near the absorbtion peak of the fluorescent material, e.g. 650 NM. The fluorescent markings on check 12 respond to the activating radiation by emitting light predominantly in the near infrared spectrum, i.e., between 650 and 800 NM. This fluorescent response passes unimpeded through a hi-pass filter 19 to photodetector 20. Visible light reflected from the surface of check 12 is blocked by filter 19 so that excitation of photosensor 20 results substantially entirely from fluorescence emanating from the markings of the indicia on check 12.

FIG. 3 shows the spectral behavior of the ink by curve 21 which represents its absorption of light, and curve 22 which represents its fluorescent emission. Note that the vertical scale is not shown since the curves are not reproduced to a common scale. Curve 22 is actually much smaller than curve 21.

FIG. 3 also shows the spectral performance of the filters 18 and 19 by curves 23 and 24 respectively. Filter 18, (curve 23) blocks the transmission to document 12 of light in near infrared wave-lengths capable of passing filter 19, (curve 24), but passes a substantial amount of visible light up to about 625 NM which is near the absorption peak of our fluorescent material. This visible light stimulates the fluorescent response of curve 22. From FIG. 3 it can be seen that most of the energy emitted by the ink of our invention, i.e. the area under curve 22, above 700 NM will pass filter 19 (curve 24) whereas the visible light that excites the ink is blocked by filter 19, (curve 24).

Control system 25, (FIG. 2) includes pattern recognition circuitry appropriate to the particular code patterns recorded which forms no part of our invention, to respond to the signals produced by photosensor 20, thus identifying the document 12 in accordance with the content of the indicia originally recorded. The document thus identified can be further automatically processed, for example, by being directed to a specific one of a plurality of sort bins 26, 27, 28. More specifically, if a bank had marked all of the checks it processes with an indicia indicating its own identity, using equipment as in FIG. 1, this bank could then automatically separate such checks from a supply of checks received from an external source, thus identifying checks it had previously processed. By also encoding the identity of the bank or other depositor from which the check was received, the check can later be automatically sorted back to its source, if return processing is required.

FIG. 4 shows the back of a bank check 29 with typical markings such as hand written endorsement 30, a rubber stamp and filled-in credit check block 31, and rubber stamp endorsements 32, 33 and 34, which may be of different colors. Markings 35 are made in accordance with our invention, using the ink jet printer 13 and an ink having a fluorescent emission in the near infrared range of electromagnetic radiation. Markings 35 are shown in the form of an intelligible bar code. The particular code format is not critical to the understanding of our invention nor does it form any part of our invention. From FIG. 3, it can be seen that the various markings 30, 31, 32, 33 and 34 occur in scattered fashion over the back of the check 29. The marking 35 of our invention can be placed on the check before or after the other markings, depending upon the sequence of processing of the check. The materials used in making the markings 30–34 generally are solvent-based dyes which are absorptive of light in the visible range.

Figure 5:
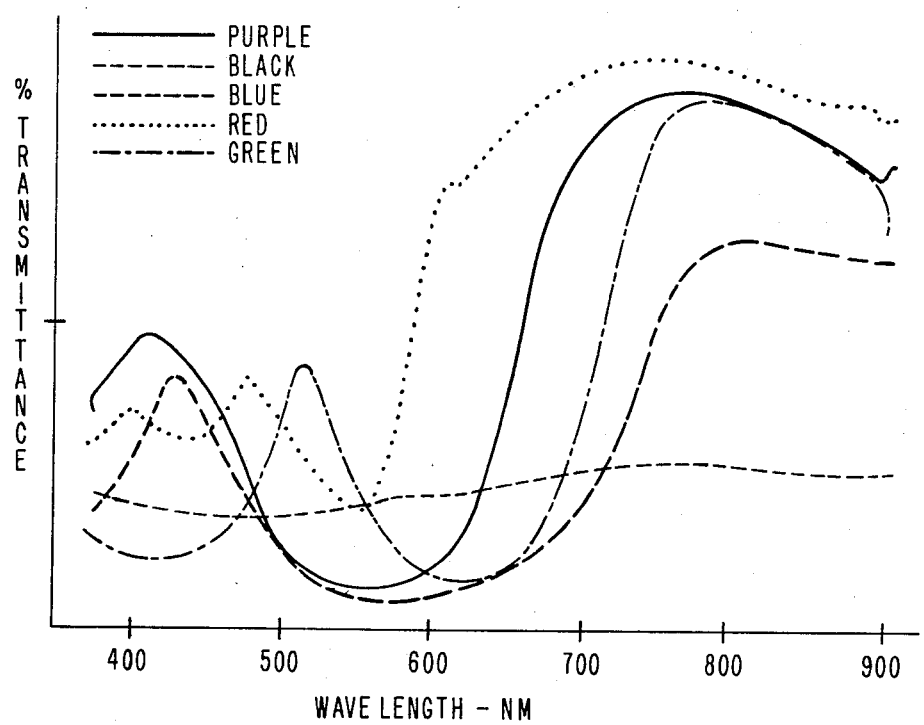
FIG. 5 is a graph showing the relative light transmittance as a function of light wavelength for a variety of typical inks used in bank check marking.

As shown by the curves of FIG. 5, most of these same inks are much more transparent to light in the near infrared. The curves of FIG. 5 were produced by measuring the reflectance of a dense spot of ink to light of various wave-lengths. The light which is not reflected is absorbed. High reflectance indicates that light of a particular wave-length would not be absorbed, but would be transmitted by the ink. Thus the fluorescence of the markings 35 of our invention can be reliably detected even in the presence of the other markings 30–34, whether they are placed on the check 29 before or after the markings 35 have been applied. The inks shown are stamp pad inks of the colors indicated. Typically most of these inks show relatively lower transmittance below 700 NM than above 700 NM.

As a preferred means of implementing our invention, we have determined that phenoxazine dyes of the structure

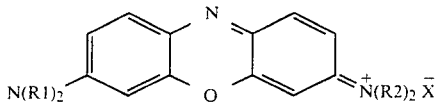

wherein R1 and R2 are alkyl and where X is the anion, are particularly convenient and effective. Other materials, such as carbocyanine dyes have been found to fluoresce in the desirable infrared spectrum but have significantly lower fluorescence efficiency than the phenoxazine dyes.

The preferred phenoxazine dye is 3,7-BIS(diethylamino)phenoxazonium nitrate. This dye fluoresces at a peak of 710 NM in response to visible light, and has its peak maximum absorption at about 650 NM. The preferred usage of this material is in a vehicle that is suitable for use in an ink jet printer. The nitrate form of this material is preferred over the chloride form since it is less corrosive in the ink jet environment.

Our preferred ink formulation is as follows:

| % BY WEIGHT | COMPONENT | FUNCTION |
| --- | --- | --- |
| 0.12 | 3,7-BIS (diethylamino) phenoxazonium nitrate | fluorescence |
| 5.0 | 2-(2-Butoxy ethoxy)ethanol | penetrant |
| 26.0 | polyethylene glycol 200 | humectant |
| 0.3 | 1 N sodium hydroxide | adjust pH |
| 0.65 | potassium hydrogen pthalate | buffer |
| 66.97 | deionized water | solvent |

The foregoing formulation is essentially a water-based ink. The water as well as the polyethylene glycol and the 2-(2-Butoxy ethoxy)ethanol dry by evaporation and penetration of a printing substrate thus leaving the dye unobstructed in its printed form. Because our dye is highly soluble it does not tend to contaminate the ink jet printer structure.

Ink jet inks are also formulated on the basis of an alcohol solvent, e.g methanol or, in the case of an impulse type jet ink, a more viscous solvent such as ehtylene glycol. Phenoxazine dyes in accordance with our invention, are both soluble and otherwise compatible with carriers of these types, as well.

Other constituents of the ink jet vehicle are selected for reasons known in the ink jet art unrelated to our invention. It is important however, that the pH of the ink vehicle be at or below the value of 6, since phenoxazine dyes have minimum deterioration with time in the presence of acid. Also, we prefer to keep the concentration of the fluorescent dye to between 0.09 and 0.12 percent by weight of the total ink solution to maximize its fluorescent efficiency while maintaining its ordinary visibility.

When the ink is to be used on documents having colored surfaces, such as light blue bank checks, we prefer to increase the fluorescent dye from beyond its expected fluorescent optimum of 0.12% to about 0.35%. The increased concentration of the dye overcomes masking tendency of the document surface colors and produces an unexpectedly clearer fluorescent output.

The breadth and effectiveness of our invention will be realized from the following specific examples:

EXAMPLE NO. 1

An ink solution was produced in accordance with our preferred formulation set forth above. The solution produced had an intense blue color and, when applied to ordinary paper, dried to a light blue color. A paper test specimen produced in this manner was subjected to visible light from an incandescent lamp. The fluorescent response was measured using an arbitrary scale. The output fluorescence was a maximum at about 710 NM.

EXAMPLE NO. 2

A number of test specimens were produced by marking paper in accordance with Example 1. The markings were overlaid by a variety of typical inks of various colors and densities. In a majority of cases, the fluorescent response of our material was clearly distinguishable by a silicon diode photodetector which viewed the specimen through a filter blocking light below wavelengths of 650 NM.

EXAMPLE NO. 3

An ink solution was produced in accordance with our preferred formulation set forth above except that the chloride anion was used in place of the nitrate. The solution produced had an intense blue color and, when applied to ordinary paper, dried to a light blue color. A paper test specimen produced in this manner was subjected to visible light from an incandescent lamp. The fluorescent response was measured using an arbitrary scale. The output fluorescence was a maximum at about 710 NM.

EXAMPLE NO. 4

A number of test specimens were produced by marking paper in accordance with Example 3. The markings were overlaid by a variety of typical inks of various colors and densities. In a majority of cases, the fluorescent response of our material was clearly distinguishable by a silicon diode photodetector which viewed the specimen through a filter blocking light below wavelengths of 650 NM.

We claim:

1. A system for marking items for subsequent automatic identification comprising, in combination, means for printing identifying intelligible markings on said items and employing a marking medium said marking medium comprising a compatible ink vehicle capable of drying by evaporation and penetration of the item without leaving a residue that is significantly absorptive of radiation in the visible or near infrared spectrum, and a material which, when applied to an item, fluoresces in response to radiation excitation to produce fluorescent radiation of wave-lengths lying principally in the spectrum comprising wave-lengths between 650 and 800 nm.

2. A marking system, as defined in claim 1, wherein said marking material comprises a phenoxazine dye.

3. A marking system, as defined in claim 2, wherein said ink vehicle has a pH of 6 or less.

4. A system, as defined in claim 3, wherein said phenoxazine dye is of the structure

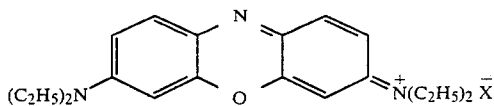

where X is the anion.

5. A system, as defined in claim 1, wherein said items comprise banking documents, such as checks, and wherein said printing means comprises an ink jet printer.

6. A system, as defined in claim 5, wherein said ink vehicle comprises, as a major constituent thereof, a solvent selected from the group of water, methanol and ethylene glycol.

7. A marking system, as defined in claim 2, wherein said marking medium includes said phenoxazine dye in a concentration of between 0.12 and 0.35% by weight with respect to said marking medium.

8. The method of automatically identifying objects comprising the steps of:

applying identifying intelligible markings to the objects using a material which, when applied to the object, fluoresces in response to radiation excitation to produce a radiation response principally in a spectrum of wave lengths between 650 and 800 mm, subjecting the objects to exciting radiation that includes substantially no radiation in said spectrum, reading said markings by selectively detecting only radiation in said spectrum emanating from the object, and identifying the object in response to the reading of said markings.

9. A method of automatically identifying objects, as defined in claim 8, wherein said marking material comprises a phenoxazine dye.

10. A method of automatically identifying objects, as defined in claim 9, wherein said phenoxazine dye is of the structure

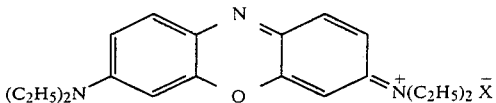

where X is the anion.

* * * * *

UNITED STATES PATENT AND TRADEMARK OFFICE
CERTIFICATE OF CORRECTION

PATENT NO. : 4,540,595
DATED : September 10, 1985
INVENTOR(S) : Acitelli et al

It is certified that error appears in the above-identified patent and that said Letters Patent are hereby corrected as shown below:

In claim 8, line 6, "mm" is changed to --nm--

Signed and Sealed this

Seventeenth Day of December 1985

[SEAL]

Attest:

DONALD J. QUIGG

Attesting Officer

Commissioner of Patents and Trademarks